US005896140A

United States Patent [19]

O'Sullivan

[11] Patent Number: 5,896,140

[45] Date of Patent: Apr. 20, 1999

[54] METHOD AND APPARATUS FOR SIMULTANEOUSLY DISPLAYING GRAPHICS AND VIDEO DATA ON A COMPUTER DISPLAY

[75] Inventor: James S. O'Sullivan, Morgan Hill, Calif.

[73] Assignee: Sun Microsystems, Inc., Palo Alto, Calif.

[21] Appl. No.: 08/498,012

[22] Filed: Jul. 5, 1995

[51] Int. Cl.[6] ........ G06F 13/00

[52] U.S. Cl. ........ 345/508; 345/526

[58] Field of Search ........ 345/501, 502, 345/526, 507–509, 511, 439, 153–155, 521

[56] References Cited

U.S. PATENT DOCUMENTS

| | | | |
|---|---|---|---|
| 4,807,189 | 2/1989 | Pinkham et al. | 365/189.05 |
| 5,097,257 | 3/1992 | Clough et al. | 345/132 |
| 5,274,753 | 12/1993 | Roskowski et al. | 345/435 |
| 5,345,554 | 9/1994 | Lippincott et al. | 345/508 |
| 5,412,399 | 5/1995 | Hara | 345/113 |
| 5,517,612 | 5/1996 | Dwin et al. | 345/501 |
| 5,625,379 | 4/1997 | Reineret et al. | 345/154 |

FOREIGN PATENT DOCUMENTS

| | | | |
|---|---|---|---|
| 0610829 | 8/1994 | European Pat. Off. | G06G 1/16 |

OTHER PUBLICATIONS

IBM Technical Disclosure Bulletin, vol. 35, No. 1A, Jun. 1992, New York, US, pp. 107–109, XP000308792 "Video Pixel Multiplexer".

"Multiple Video Windows for Workstations," May 1994, The Computer Applications Journal, Issue #46, p. 12.

*Primary Examiner*—Kee M. Tung

*Attorney, Agent, or Firm*—Beyer & Weaver, LLP

[57] ABSTRACT

A method and apparatus for displaying graphics data and video data, such as a video window, on a computer display. A graphics adapter chip stores graphics pixel data in a graphics memory, and a video source stores video pixel data in a video memory. The graphics and video memories sequentially output blocks of pixel data to the display screen on output channels. Graphics data is selectively outputted on a number of graphics channels and video data is selectively outputted on the same number of video channels. The video channels are multiplexed with the graphics channels to form the output channels and either graphics data or video data can be output to the display on each output channel. A number of dummy video pixel values can be inserted before video data in the video memory to align video pixels between blocks of graphics data on the display screen. In one embodiment, a source selection element selects graphics and video channels by reading a window-type memory to determine which pixels on the screen are intended to display graphics data and which pixels are intended to display video data. The data on the output channels is converted to a form suitable for driving the display screen of the computer system.

32 Claims, 8 Drawing Sheets

METHOD AND APPARATUS FOR SIMULTANEOUSLY DISPLAYING GRAPHICS AND VIDEO DATA ON A COMPUTER DISPLAY

BACKGROUND OF THE INVENTION

The present invention relates generally to an apparatus and method for displaying graphics on a computer display screen, and more particularly to simultaneously displaying data from graphics and video sources on the same screen.

Graphical applications are becoming increasingly popular with computer users. High resolution pictures, animation, and other visual and graphical effects displayed on a computer screen have become commonplace as computer microprocessors are developed having greater speed and processing power. Graphical user interfaces (GUI's), for example, are used widely. It is generally accepted that computers having graphical user interfaces (GUI's) are easier to use, and that it is (quicker to learn an application program in a GUI environment than in a non-GUI environment.

The increased graphical capabilities of computers have led to the display of video signals on computer display screens. A video source, such as a video camera, television receiver, etc. can be used to input a video signal to a computer. Components such as an analog-to-digital converter (ADC) convert the analog video signals to digital signals which the computer can process. These digital signals are typically organized into "pixels," which are fundamental picture elements of an image on a display screen. The computer eventually sends the digital video data to a digital to analog converter (DAC) to display analog video signals on a computer display screen which look like the displayed images and animations of a CRT of a television, for example. Many computers can display live video signals in full color and resolution with no loss in frame rate or detail.

A common application of computer-displayed video signals is to display a video "window" on a screen surrounded by displayed computer-generated graphics. For example, in a GUI, the computer typically displays a graphical background, several menu selections, icon shapes, open windows on the screen, etc. A live video window can be displayed on one portion of the screen while the rest of the screen displays standard graphical objects. A computer user could thus watch a live video window while working with other computer applications, such as a word processing window or a spreadsheet window. The size of the video window can be set by the user in some applications, although the resolution and frame rate for a certain window size depends on the speed and processing power of the computer and its display circuitry.

In displaying both graphics and video on a computer screen simultaneously, the computer typically uses memory to store the graphics and video data before outputting the data to the screen. FIG. 1 is a block diagram of a typical prior art display system 10 used in a computer to simultaneously display video data and graphics data on the same screen. Commands from a microprocessor are sent on a system bus 12 to a graphics adapter chip 14, which can be implemented as an application specific integrated circuit (ASIC). Graphics adapter chip 14 receives the commands such as drawing commands, rendering commands, or commands to transfer data in memory and performs those commands. Graphics adapter chip 14 sends generated data on bus 15 to VRAM or other types of memory chips 16 to store the generated graphics data. Graphics data from the VRAM chip 16 is sent to digital-to-analog converter (DAC) 18 when instructed by graphics adapter chip 14. DAC 18 converts the digital graphics data to analog data to be displayed on a display screen 19. A common method of display is to output separate red, green, and blue (KGB) signals from the DAC to a color display screen. A video window 21 is shown displayed on display screen 19 with a graphics background 22.

Display system 10 also includes a video source 20 for inputting a video signal. Video sources such as a video camera, a video cassette recorder, or a television receiver are typically used. The analog video signal from the video source is input to an analog-to-digital converter (ADC)/decoder/scaler 24, which converts the analog video signal to a digital signal suitable for use with the other digital components of the system and extracts usable video data and synchronization signals from the digitized video data. The ADC/decoder/scaler 24 outputs digital video data, synchronization signals and other data derived from components well known to those skilled in the art on bus 26, which is mixed with bus 15 output from graphics adapter chip 14. The video data is stored in VRAM 16 and thus shares the memory with graphics data generated by graphics adapter chip 14. Typically, video data is stored in a particular section of memory and is readily accessible by the graphics adapter chip 14. Graphics adapter chip 14 receives information from the microprocessor indicating where the video window is located on the screen and causes graphics data or video data to be output from VRAM 16 when appropriate.

The prior art display system shown in FIG. 1 is useful in that a displayed video window can be stored in existing memory that is also used for graphics data, thereby obviating any need for additional memory and cost. However, this display system is limited by the bandwidth of the memory bus 15. Since graphics data and video data share the same bus, the amount of graphics and video data that can be stored in VRAM 16 and transferred to DAC 18 at one time is substantially reduced, especially when displaying "true color" 24-bit video pixels, which require a large memory bandwidth. The performance of the display system is thus reduced, and either the displayed video window is limited to a small size or a low resolution so that the full frame rate of the video signal can be displayed, or the frame rate of the video signal is reduced so that a particular resolution or window size can be displayed. In either case, the presentation of a video signal in the video window is degraded.

What is needed is a display system of a computer system that provides a large memory bandwidth capable of displaying a large video window at a high resolution and full frame rate while displaying graphics on the other portions of the display screen. The video window should be displayed without any video image clipping and without any restrictions as to its displayed location on a computer screen.

SUMMARY OF THE INVENTION

To achieve the foregoing and other objects and in accordance with the purpose of the present invention, a method and apparatus is disclosed for simultaneously displaying graphics data and video data on a display screen of a computer. Separate graphics and video memories are used such that memory bandwidth and data transfer rates are higher, leading to larger displayed video window sizes and more realistic video presentation. The present invention uses dummy video pixel insertion in one embodiment to prevent losing video pixels and/or restricting the placement of the video window on the computer screen.

A method is disclosed for simultaneously displaying graphics data and video data on a display screen of a computer system. The computer system includes graphics memory and video memory arranged to store image information to be displayed on the display screen. The graphics memory and the video memory each sequentially transmit blocks of data to the display screen on output channels, and each block of data includes data for multiple screen pixels that are transmitted simultaneously. The method includes steps of storing graphics data received from a graphics source in graphics memory and storing video data received from a video source in video memory. When only graphics data is to be presented on the screen in a block of screen pixels, a block of graphics data is transmitted to the screen over a number of graphics channels. When only video data is to be presented on the screen, a block of video data is output from the video memory on a number of video channels corresponding to the number of graphics channels. The video channels are coupled to the graphics channels to form output channels, and either graphics data or video data can be output to a display screen on each output channel. When both graphics data and video data are to be transmitted to the screen simultaneously in a single block of data on the output channels, the output channels that are intended carry graphics data are selectively caused to transmit only graphics data. Likewise, the output channels that are intended to carry video data are selectively caused to transmit only video data. In one embodiment, the video memory stores a row of output data in a shift register before the row is output. A portion of the output data is shifted into an output buffer before the data is output. In one embodiment, to align the video window between a block of graphics data, a number of dummy video pixel values are inserted before video data in the shift register of the video memory. The number of dummy pixel values is based on the position of the edge of the video window and the number of output channels. The selection of graphics and video channels includes reading a window-type memory to determine which pixels on the screen are intended to display graphics data and which pixels on said screen are intended to display video data.

An apparatus for displaying a video window on a display screen of a computer system includes a graphics memory having a set off output graphics channels suitable for simultaneously transmitting graphics data for a plurality of screen pixels. The apparatus also includes a video memory having a set of output video channels suitable for simultaneously transmitting video data for a plurality of screen pixels. Each video channel is coupled to a corresponding graphics channel to form a pair of channels, and an output channel is coupled to each of the pairs of graphics channels and video channels. A selection element is used to selectively cause data from the graphics channels or the video channels to pass on each of the output channels. The output channels may transmit a block of pixel data that simultaneously includes both graphics data and video data divided on a discrete pixel basis. A converter element is used for converting data on the output channels into a form suitable for driving the display screen of the computer system. In one embodiment, the selection element includes window-type memory having a memory map of the location of a video window on the computer screen. In the preferred embodiment, the video memory stores a number of dummy pixels positioned before the video data in the video memory. These dummy pixels are copied values of actual video pixels and are output on video channels that are not selected to output data to the computer screen. Only dummy pixels are thus thrown away, and actual video data is not lost. A frame grabber controller is preferably coupled to the video memory and the source element for controlling the output of video data from the video memory. In an alternate embodiment of the present invention, a digital to analog controller can be used to select graphics and video lines to output graphics and video pixels stored in a queue.

The present invention permits an increased amount of pixel data to be transferred from memory to the display screen at one time. Separate graphics and video memories can each output a larger bandwidth of data. With an increased data transfer rate, a larger and more realistic video window can be displayed on the computer screen.

A preferred embodiment of the present invention also permits a video window to be presented on a display screen without having any part of the video image lost or clipped at the interface between graphics pixels and video pixels. This feature also allows the video window to be placed on any graphics pixel boundary displayed on the screen.

These and other advantages of the present invention will become apparent to those skilled in the art after reading the following descriptions and studying the various figures of the drawings.

DETAILED DESCRIPTION OF THE INVENTION

Figure 1:
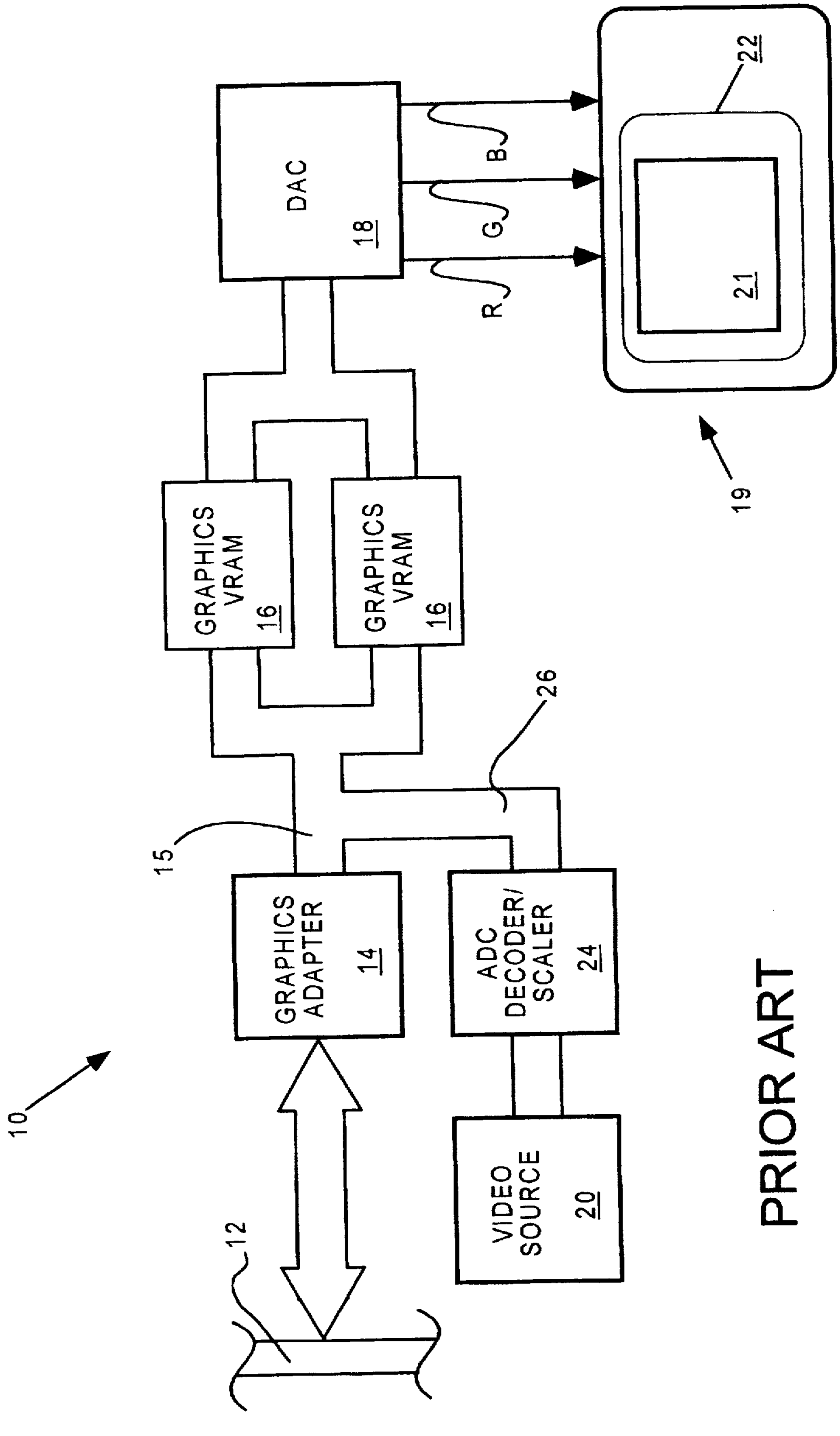
PRIOR ART FIGURE 1
FIG. 1 is a block diagram of a prior art computer display system.
Figure 2:
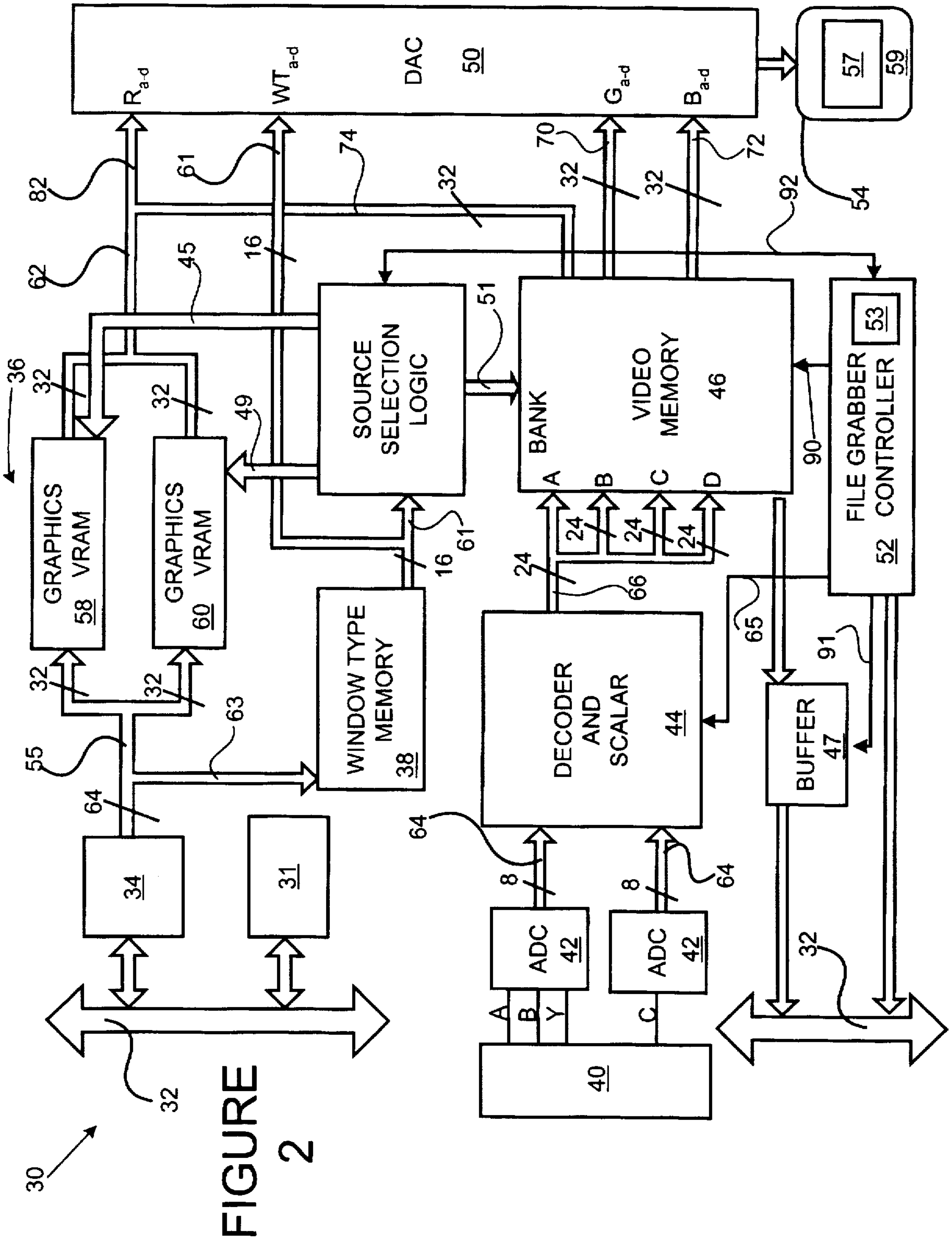
FIG. 2 is a block diagram of a first embodiment of a computer display system in accordance with the present invention.

FIG. 2 is a block diagram of a first embodiment of a computer display system 30 that incorporates the present invention to display a video window on a display screen. Display system 30 includes a microprocessor 31, a system bus 32, a graphics adapter chip 34, graphics memory 36, window-type memory 38, a video source 40, analog-to-digital converters (ADC's) 42, a decoder/scaler 44, a video memory 46, source selection logic 48, digital-to-analog converter (DAC) 50, frame-grabber controller 52, and a display screen 54. While buses of specified width (i.e., 8-bit buses, 32-bit buses, etc.) are described below as an example, it should be appreciated that a variety of different types of buses having different numbers of lines can be used in different embodiments.

Microprocessor 31 is the main processor of the computer system and is coupled to system bus 32 for data transfer to components and peripherals of the system, including display system 30. System bus 32 is also coupled to RAM, ROM, input/output ports, and other components generally used in a computer system (not shown). System bus 32 can be used to send data signals, address signals, and control signals.

Graphics adapter chip 34 receives data over system bus 32 and creates graphics pixel data to be displayed on a display screen. Commands from the microprocessor of the computer system are input to the graphics adapter chip on the system bus and instruct the chip to draw graphical objects, mathematically render images, etc., and to create pixel data to be displayed on the display screen. A suitable graphics adapter chip for use in the described embodiment is a Sun GX or TGX application specific integrated circuit (ASIC), manufactured by Sun Microsystems, Inc. of Mountain View, Calif. This ASIC includes a graphics rendering engine, a memory controller, and a CRT/display controller on a single chip. Separate chips having these functions can be used as well. Graphics adapter chip 34 outputs graphical data on bus 55, which in the described embodiment is a 64 bit bus. Bus 55 is divided into two 32-bit wide buses which input data to graphics memory 36. The graphics data is preferably formatted into a number of pixels, wherein a pixel is the smallest displayed picture element on the display screen. Taken collectively, the pixels form an image. Pixels are generally positioned in rows and columns on the screen. Each pixel is represented by a number of bits, and the numerical value of the bits indicates a pixel's attributes, such as the color or shade of the pixel.

The graphics adapter chip controls the display of graphics pixels by continuously outputting stored pixels from graphics memory to DAC 50. Graphics adapter chip 34 also receives information from the microprocessor indicating where a video window is to be displayed on the display screen. This information, is input to window-type memory 38 (described below).

Graphics memory 36 receives graphics data from graphics adapter chip 34 and stores the data until it is output and displayed on the screen. In the described embodiment, two banks of memory 58 and 60 are used to store the graphics data, where the first four of any eight horizontally contiguous pixels are stored in one bank 58, and the second four pixels are stored in the second bank 60. Graphics pixels stored in graphics memory banks 58 and 60 have eight bits apiece in the described embodiment, which are used to store information about the color of the displayed pixel. In the described embodiment, each bank 58 and 60 is a 128K×8 VRAM chip. In alternate embodiments, other types of memory can be used as well, including dynamic random access memory (DRAM). Also, in alternate embodiments, the graphics pixels can have greater or fewer than 8 bits per pixel, such as 16-bit or 24-bit pixels. If a pixel includes more than 8 bits, a larger graphics memory than the described memory would typically be required to store the pixels, and a greater width of the datapath between graphics memory and DAC 50 would be needed. In addition, a DAC 50 supporting the larger pixels and multiplexing would be needed.

Graphics memory 36 outputs data on 32-bit bus 62 in the described embodiment. The outputting of graphics pixels is controlled by graphics adapter chip 34 using address and control lines (not shown). The graphics adapter chip continuously outputs graphics pixels at a rate consistent with the display screen's refresh rate. In the described embodiment, the data on bus 62 is divided into 4 pixels of 8 bits per pixel, for a total of 32 bits. Each 8 bits of bus 62 is considered a "graphics channel" that carries information about 1 pixel at a time; bus 62 therefore includes four graphics channels in the described embodiment. The four graphics channels transmit four pixels simultaneously from the graphics memory; herein, these four pixels are considered a "block" of graphics data. "N" graphics channels can be used in alternate embodiments, where "N" can be a value of 2 or greater.

Each bank 58 and 60 of graphics memory 36 includes an output buffer which outputs a single 32-bit block of four pixels at a time. When using a VRAM or similar type of memory, shift registers in graphics memory 36 can be used to provide pixels from the memory storage locations to the output buffer, as described below with reference to video memory 46. Banks 58 and 60 also include tri-state buffers for each output bit. These tri-state buffers can be enabled or disabled to selectively output bits at specific locations in the output buffer. Source selection logic 48 can control the tri-state buffers to select which graphics channels are enabled to output graphics pixels (described below). The graphics channels are multiplexed with video channels from a video memory and sent to a DAC to be output to the display screen, as described below.

Window-type memory 38 is coupled to graphics adapter chip 34 via bus 55. In the described embodiment, window-type memory 38 receives the lower 4 bits of bytes output by graphics adapter chip 34 on a bus 63; since graphics adapter chip 34 preferably outputs 8 bytes, window-type memory 38 receives 32 bits. The microprocessor 31 writes data into window-type memory 38 through the graphics adapter chip 34 indicating the pixel layout of the display screen, i.e., which pixels on the display screen are graphics pixels and which pixels are video pixels. The window-type memory stores the screen layout as pixel codes indicating a pixel-by-pixel description of the display screen. For example, the microprocessor can store a description of the location of the video window on the screen in the window-type memory. In this description, video pixels can be indicated by a certain pixel code and graphics pixels can be indicated by a different pixel code. In the described embodiment, window-type memory 38 is four bits deep; thus, a video pixel can be indicated by a pixel code of 15, and a graphics pixel can be indicated by a pixel code between 0 and 14. The codes between 0 and 14 can contain other data related to the display screen layout. For example, data related to color of pixels for each specific application program that is running on the computer system can be stored, such as color palette information (described below). In alternate embodiments, a smaller window-type memory can be used, since pixel codes of only 1 bit per pixel are actually required to store pixels as either video or graphics pixels in the window-type memory.

The data in window-type memory 38 is accessed by the source selection logic 48 through bus 61, which is preferably a 16-bit bus. Four 4-bit pixel codes (one pixel for each channel) is supplied to the source selection logic on bus 61. Bus 61 is also coupled to DAC 50 to supply the four pixel codes to the DAC from window-type memory. For example, when the DAC 50 reads a value of 15 on bus 61 from the window-type memory data, it expects a 24-bit video pixel (from video memory), and when the DAC reads a value between 0–14 on bus 61, it expects an 8-bit pixel (from graphics memory). In the described embodiment, window-type memory is the same size as each bank of graphics memory 36, 128K×8.

Video source 40 is used to input a video signal into the display system 10. Video source 40 can be a television receiver, video camera, video cassette recorder, or any other apparatus capable of producing an analog video signal.

Video signals typically are produced in one of two types. One type, composite video, includes a channel on which a brightness signal, a color signal and various synchronization signals are carried. Composite video signals have various formats, including NTSC, PAL, and SECAM. The other type of video signal is S-video, which includes a luminance signal and a chrominance signal. In the described embodiment, either type of video signal may be input to the display system 10. ADC's 42 are used to convert the analog input video signal to a digital signal which can be manipulated by the display computer system. In the described embodiment, a TDA8708 for composite video (and part of S-video) and a TDA8709 for S-video, both manufactured by Philips/Signetics, are used as ADC's 42. In alternate embodiments, a video source can provide a digital video signal directly so that no ADC 42 is required.

The ADC's 42 output a digital signal on buses 64. In the described embodiment, busses 64 are 8-bit buses that send a digital signal representing the analog video input signal. Two buses 64 are provided in the described embodiment, each bus corresponding to a type of video signal (e.g., composite or S-video). Buses 64 are coupled to decoder/scaler 44, which decodes the 8-bit input signal to a 24-bit red-green-blue (RGB) output signal. A commonly-used pixel format for digitized video is a 24-bit RGB format, where each of the three primary color portions (red, green and blue) is described by 8 bits. 24-bit pixel format is considered "true color", since a much larger and realistic range of colors can be displayed than if only 8 bits were used. Other N-bit pixel formats can also be used in alternate embodiments; for example, 16-bit or 15-bit RGB pixels and 16-bit YUV pixels are common formats. The decoder extracts the synchronization signals from the digital video signal and converts the raw digital data into standard luminance and chrominance signals in the RGB format. The scaler of decoder/scaler 44 also scales the input digital data from a standard, predetermined resolution that is automatically decoded by the decoder to a resolution specified by the microprocessor. For example, if a user resizes the video window on the display screen, the microprocessor sends the new video window size to the frame grabber controller 52 on system bus 32. The frame grabber controller then sends the video window size information to scaler 44 on bus 65. Scaler 44 adjusts the resolution of the video window and outputs video pixels that correspond to the new video window size, as is well known to those skilled in the art. In the described embodiment, the scaler scales the video window from a standard resolution of 640×480 pixels to the desired resolution. Decoder/scaler can be implemented using model SAA7196 manufactured by Phillips/Signetics. In the described embodiment, 24-bit RGB video data is output from decoder/scaler 44 on bus 66.

Video memory 46 is coupled to bus 66 output from decoder/scaler 44. In the described embodiment, bus 66 is routed into four buses of 24 bits each, where each bus is input into a different bank of video memory 46 (Banks A-D). Banks A-D are incorporated in a sequential access memory port of the video memory (all four banks are shown as one box 46 in FIG. 2). The data at each bank of the video memory is clocked in sequentially and is stored in the same order in the memory (the data is preferably clocked into shift registers within the video memory and then stored from the shift registers to a DRAM portion (banks A-D) of the video memory. The shift registers are described below). Thus, the decoder/scaler 44 sends out a 24-bit pixel which is clocked into Bank A, another video pixel which is clocked into Bank B, and so on. A video pixel output by decoder/scaler 44 can be clocked into several ports simultaneously if desired; this is accomplished to insert "dummy pixels" in the video memory and is described in greater detail with reference to FIGS. 3*a*, 3*b*, and 4. The video memory of the described embodiment is 1024×512×24, so that the maximum-sized video window having 24-bit pixels stored in the video memory is 1024×512 pixels. In alternate embodiments, differently-sized video windows or video memories can be used; for example, two identical 512×512×24 storage areas of the video memory can be used to reduce the "video tearing" effect, which occurs when computer monitor refresh rates differ widely from video source refresh rates. The two identical storage areas in memory can be used as two buffers of video memory in which video pixels are stored. The two buffers can alternately output a complete frame of video data as the buffers are filled so that no partial frames; are displayed on the screen.

Video memory 46 of the described embodiment includes a second sequential (or serial) access memory port used for outputting video pixels from the video memory. The output channels are organized into three buses of 32 bits each, where each group of 32 bits is used for one primary color of red, green, or blue. Since 8 bits represents each primary color in 24-bit video signals, each of the 32-bit buses includes four video channels of eight bits each. Each 32-bit bus thus can send one color component (R, G, or B) of four video pixels, one video pixel on each video channel. A, described below, DAC 50 receives 24-bit video pixels separated into the three RGB 8-bit portions. Bus 74 thus carries the 8-bit red components of 4 video pixels, bus 70 carries the 8-bit green components of 4 video pixels, and bus 72 carries the 8-bit blue components of 4 video pixels. As referenced herein, a "block" of video pixels refers to the 4 video pixels output on buses 74, 70, and 72.

In the described embodiment, buses 70 and 72 are coupled to Green and Blue inputs of DAC 50, respectively, while bus 74 is multiplexed with graphics channels 62 from graphics memory 36 and coupled to the Red input of DAC 50 (described below). Since bus 62 and bus. 74 each include four channels, the graphics channels and video channels employ 4-way multiplexing. In alternate embodiments, N-way multiplexing can be employed, where N can be a value of 2 or greater.

When video pixels are output from the video memory 46, a row of video pixels is loaded into shift registers (or serial access memory) included in the video memory from banks A–D. For example, a row can equal 1024 pixels in a horizontal scan line. A block of video pixels is then shifted from the shift registers into an output buffer that stores a block of video pixels and which is also included in video memory 46. In the described embodiment, a block of video data includes 4 video pixels, one pixel per video channel, where each Bank is coupled to one video channel. The output buffer, similar to the output buffer described in graphics memory 36, outputs a single block of pixel data at a time for three 32-bit buses, thus totalling 96 bits. In addition, video channels are coupled to the output buffer of video memory 46 and are controlled by tri-state buffers which either enable a video channel to carry data or disable the video channel and prevent data from being output on bus 74. The tri-state buffers of bus 74 are controlled by source selection logic 48, which is described below. Preferably, one block of video pixels is output from the output buffer, and a new block is shifted from the shift registers to the output buffer. Once the shift register has been exhausted, the next row of pixels is loaded into the shift register from Banks A–D.

Video memory 46 of the described embodiment also preferably includes a random access port coupled to a bus 76 which is connected to the microprocessor through the system bus 32. The random-access port can be used to randomly access the contents of video memory 46. An application that uses such a configuration is teleconferencing, in which a video signal depicting, for example, a user's face is sent to the microprocessor and transmitted through a networking interface to another computer/display screen. A user could thus receive a video signal from a different user to display on the computer screen while the user's own picture would be recorded by a video camera near the screen and sent to the other user's computer for that user to view on his screen. When outputting video data from the random access port of video memory 46, a buffer 47 is used to reduce loading on microprocessor bus 32.

Video memory 46 is a tri-port video memory, such as MT43C8128 manufactured by Micron Semiconductor. The three ports are the input sequential access port, the output sequential access port, and the random access port. In alternate embodiments, other types of video memory can be used. For example, a dual port video memory can be used which includes one sequential access port and one random access port. The sequential access port can be used for outputting the video pixels to the DAC 50, and the random access port can be used both as an input port for video pixels from decoder/scaler 44 and as an output port to send video data to the microprocessor and over a network for teleconferencing. The dual port video memory is typically cheaper than the tri-port video memory, but it is slower due to the shared use of the random access port as an input and an output.

Source selection logic 48 is used to select when graphics pixel data and video pixel data are to be output to the DAC 50 and displayed on the display screen. The source selection logic monitors pixels codes that are caused to be output of window-type memory 38 on bus 61 by graphics adapter chip 34. The source selection logic receives the pixel codes via 16-bit bus 61 in groups of four, where each pixel code identifies a graphics pixel or a video pixel. The pixel codes instruct the source selection logic to turn outputs of the graphics and video memories on or off. The source selection logic sends enable or disable signals on bus 45 to the tri-state buffers at the output buffer of bank 58 of the graphics memory 36, and sends similar signals on bus 49 to the tri-state buffers of bank 60 of graphics memory 36. Some or all of the tri-state buffers are enabled when the window-type memory indicates which graphics channels should output graphics pixels, and the tri-state buffers which are not selected to output pixels are left in a high-impedance state. Similarly, the pixel codes instruct the source selection logic to send enable or disable signals on bus 51 to the tri-state buffers of bus 74 at the output buffer of video memory 46. Tri-state buffers are enabled for video channels which are indicated to output video pixels.

In the described embodiment, source selection logic 48 provides the following signals on bus 51 to the video memory 46, determined by the following logic equations:

EA=/(WTA0&WTA1&WTA2&WTA3)

EB=/(WTB0&WTB1&WTB2&WTB3)

EC=/(WTC0&WTC1&WTC2&WTC3)

ED=/(WTD0&WTD1&WTD2&WTD3)

where EA, EB, EC, and ED are the (active-low) signals that enable or disable the tri-state buffers of the video memory, and, for example, WTA[0:3] are the four bits from window type memory forming a pixel code ("/" indicates the inversion of the term in parentheses). In the described embodiment, if the four bits are all high, which is a pixel code of 15, then a video pixel is indicated. The FIA signal is thus sent as an enable (low) signal to enable the tri-state buffer for the corresponding output video channel of bus 74 of video memory 46. If any of the bits of the pixel code are low, then a disable (high) signal is sent to the corresponding tri-state buffer to disable that video channel of the video memory. WTB, WTC and WTD are the three other 4-bit pixel codes read on bus 61 to enable or disable the appropriate tri-state buffers of video memory 46.

Source selection logic 48 provides the following signals on bus 45 to bank 58 of graphics memory 36:

B0_EA =B0_GRE0+(WTA0 & WTA1 & WTA2 & WTA3)

B0_EB =B0_GRE0+(WTB0 & WTB1 & WTB2 & WTB3)

B0_EC =B0_GRE0+(WTC0 & WTC1 & WTC2 & WTC3)

B0_ED =B0_GRE0+(WTD0 & WTD1 & WTD2 & WTD3)

The following signals are provided on bus 49 to bank 60 of graphics memory 36:

B1_EA=B0_GRE1+(WTA0 & WTA1 & WTA2 & WTA3)

B1_EB=B0_GRE1+(WTB0 & WTB1 & WTB2 & WTB3)

B1_EC=B0_GRE1+(WTC0 & WTC1 & WTC2 & WTC3)

B1_ED=B0_GRE1+(WTD0 & WTD1 & WTD2 & WTD3) where B0_EA-D and B1_EA-D are the (active-low) signals that enable or disable the tri-state buffers on bank 58, B0_GRE0 and B0_GLRE1 are enable signals from graphics chip 34 to enable either bank 58 or bank 60, and WTA-D[0:3] are the four bits forming a pixel code. If the four bits for a channel are not all high, and the B0_GREx signal is high, then a graphics pixel (pixel code of 0–14) is indicated, and the enable signal, such as B0_EA, is set low to enable the corresponding tri-state buffer and graphics channel of the indicated bank of graphics memory 36. If all of the bits are high, then the enable signal is set high to disable the tri-state buffer for that channel. In other embodiments, other logic can be used to achieve the same results.

Source selection logic 48 also sends a frame grabber enable signal on bus 92 to frame grabber controller 52 on bus 92 to signal the frame grabber controller to begin sequencing video pixels out of video memory 46. The frame grabber enable signal is output from the source selection logic when the source selection logic receives a pixel code of 15 (all 4 high bits), indicating a video pixel, on any of the four channels output on bus 61 from window-type memory 38. Source selection logic 48 also receives two signals from the frame grabber controller on bus 92 which indicate if a display update cycle has occurred and if, so, allow the frame grabber controller to control the video memory's tri-state buffers for that cycle (described below).

In an alternate embodiment, multiplexing logic can be used to select specific graphics and video channels instead of enabling or disabling memory outputs, as is well known to those skilled in the art.

Digital-to-analog converter (DAC) 50 is coupled to several input channels for the purpose of converting input digital data to output analog signals used by the display screen to display pixels. In the described embodiment, DAC 50 is a Brooktree BT463 DAC which includes an R input, a G input, a B input, and a WT input. DAC 50 preferably has two modes to display graphics pixels: a true color, 24-bit display mode, and a "pseudo-color" mode. The pseudo color mode is an 8-bit display mode which uses a programmable color "palette" stored in the DAC to display "pseudo" 24-bit colors for graphics pixels. The color palette is a hardware (software-programmable) look-up table that matches 24-bit colors with the 8-bit graphics values that are input to the DAC in pseudo color mode. For example, an 8-bit graphics pixel value between 0–255 that is iriput to DAC 50 is referenced on the color palette, which stores a corresponding 24-bit value for each 8-bit value. The corresponding 24-bit value is used as the color of the 8-bit pixel. The 24-bit values in the color palette are previously chosen to correspond to specific 8-bit values. Typically, different color palettes are used for different application programs executed by microprocessor 31 (or another connected microprocessor); for example, the active application program provides an individual color palette from which all displayed 8-bit pixels are referenced. When the active application program is changed, a new color palette with different colors can be loaded and used by DAC 50. Pseudo color mode has the advantage that the graphics pixels require less memory space and processing time., with the drawback of less realistic pixel colors.

The mode of DAC 50 is selected for each pixel by the pixel codes from window-type memory 38. Graphics adapter chip 34 causes window-type memory 38 to send pixel codes to DAC 50. If the pixel code from the window-type memory is a value between 0–14, indicating a graphics pixel, the bits of the pixel code can be used to select either true color (24-bit) mode or pseudo color (8 bit) mode. For example, if the first bit of the pixel code is 0, one mode is indicated, and if the first bit is 1, the other mode is indicated. This graphics pixel code information can also be used to select different palettes for different graphics pixels in pseudo color mode, as is well-known to those skilled in the art.

DAC 50 uses all three inputs R, G, and B for video pixels. A video pixel is separated into three 8-bit portions, where each portion is input to one of the RGB inputs. A video pixel is combined into 24 bits in DAC 50. The R input preferably receives the first 8 bits, the G input the middle 8 bits, and the B input the final 8 bits of a video pixel. Each RGB input receives 4 video pixels at once in the described embodiment, each video pixel being sent on an 8-bit video channel. The 32-bit buses shown in FIG. 2 each represent four 8-bit video channels.

The R input of DAC 50 is a special case. Since the graphics pixels from graphics memory 36 are 8-bits (in the described embodiment), only the R input to the DAC 50 is used for displaying graphics pixels in the described embodiment. Since both graphics data and video data use the R input, the graphics channels of bus 62 and the video channels of bus 74 coupled to the R input are multiplexed. Either a graphics pixel or a video pixel is sent to the R input of the DAC on each channel. In other embodiments, different or additional inputs to DAC 50 can be similarly multiplexed.

As shown in FIG. *2a*, each 8-bit graphics channel 76 of bus 62 is connected to a corresponding 8-bit video channel 78 of bus 74. Output channels 80 of bus 82 are connected from the junction of the graphics and video channels to the DAC 50. A block of output pixels includes the pixels on the four output channels 80. As shown in FIG. *2b*, the connection of each 8-bit channel 76 and 78 includes a similar connection between each graphics bit line 84 in channel 76 with each video bit line 86 in channel 78. An output bit line 88 is coupled to each graphics and video bit line connection. Since either graphics data or video data is displayed on the screen, either a graphics channel 76 or a connected (corresponding) video channel 78 is "selected" to output data (i.e., allowed to send its data) on the connected output channel 80. The method of sending graphics and video pixels and selecting appropriate channels is described below Referencing FIG. 2, frame grabber controller 52 is coupled to the microprocessor of the computer system by system bus 32. Frame grabber controller can be implemented with an ASIC controller or with a different architecture; for example, a Xilinx 4000-series field programmable gate array (FPGA) can be us.ed. The frame grabber controller controls the sequencing of input video data and output video data to and from video memory 46. Bus 90, including address and control lines, is used for general control of the video memory, including refresh, clocking video input, video output, and microprocessor access, as is well known to those skilled in the art. Frame grabber controller includes dummy pixel logic 53 for the insertion of dummmy pixels in the video memory, as described below.

Frame grabber controller 52 also controls buffer 47 via line 91. Line 91 controls when video data from the random access port of video memory is sent on the system bus to the microprocessor to be sent out on networks wires, such as in teleconferencing applications.

Frame grabber controller 52 also receives signals from and sends signals to source selection logic 48 on bus 92. As described above, bus 92 preferably includes 3 lines. One line is used to carry a signal from the source selection logic 48 to frame grabber controller 52 indicating that video pixels should be output on bus 74. Frame grabber controller 52 would begin to shift video pixel data out of video memory 46 upon receiving this signal.

The remaining two lines of bus 92 are used to send a display update signal from frame grabber controller 53 to source selection logic 48. The display update signal allows the frame grabber controller to control the serial outputs of video memory during a display update cycle or "blanking." A display update cycle occurs when a display device, such as a CRT or display screen, must stop displaying data so that the scan line can be reset from the right edge of the screen to the left edge of the screen ("retrace") at the beginning of the next scan line. The frame grabber controller knows when the display update cycle occurs and so controls the video memory tri-state buffers to load data into the shift registers in the video memory during the display update cycle, as is well known to those skilled in the art. The second line of bus 92 selects which logic is controlling the video tri-state buffers (either the source selection logic (e.g., low) or the frame grabber controller (e.g., high)). When the output device is on a display update cycle, the frame grabber controller is selected. The third line of bus 92 is used to transmit a serial enable signal from the frame grabber controller; this signal is used when the frame grabber controller has been selected by the second line of bus 92. The serial enable signal allows the frame grabber controller to control the tri-state buffers during the display update cycle.

In the described embodiment, frame grabber controller 52 includes dummy pixel logic 53. Dummy pixel logic 53 is used to control the clocking of each video pixel to video memory 46 from decoder/scaler 44. Logic 53 uses the dummy pixel value to determine how many dummy pixels are to be inserted in the input video pixel stream before the first video pixel on a displayed horizontal scan line. The insertion of dummy pixels are described in greater detail with respect to FIGS. 3*a* and 3*b*, and a preferred implementation of dummy pixel logic 53 is shown in FIG. 4. Dummy pixel logic is shown implemented on the same integrated circuit chip as frame grabber controller 52. In alternate embodiments, dummy pixel logic 53 can be implemented as a separate chip or, for example, on the same chip as source selection logic 48.

Display screen 54 is a standard computer monitor or similar display preferably capable of displaying high resolution graphical pictures. Display screen 54 is coupled to DAC 50 and receives analog RGB outputs which determine the colors of pixels displayed by screen 54. A video window 57 of video pixels is preferably displayed amid a background of graphics pixels 59.

The display system of FIG. 2 operates to display graphics data and video data on a display screen as follows. Microprocessor 31 sends instructions on system bus 32 to graphics adapter chip 34 to store a pixel code map in window-type memory 38 which indicates the current location of the pixels of a video window on the display screen. The microprocessor sends instructions to the graphics adapter chip to generate graphics pixel data in accordance with the microprocessor commands. The graphics adapter chip stores the generated graphics pixels in both banks of graphics memory 36. When the screen is ready to display pixels, the graphics adapter chip sends signals to graphics memory 36 to send out the graphics pixels in accordance with the display screen's parameters, such as refresh rate. The graphics adapter chip continuously sends out graphics data from the graphics memory.

Figure 3A:
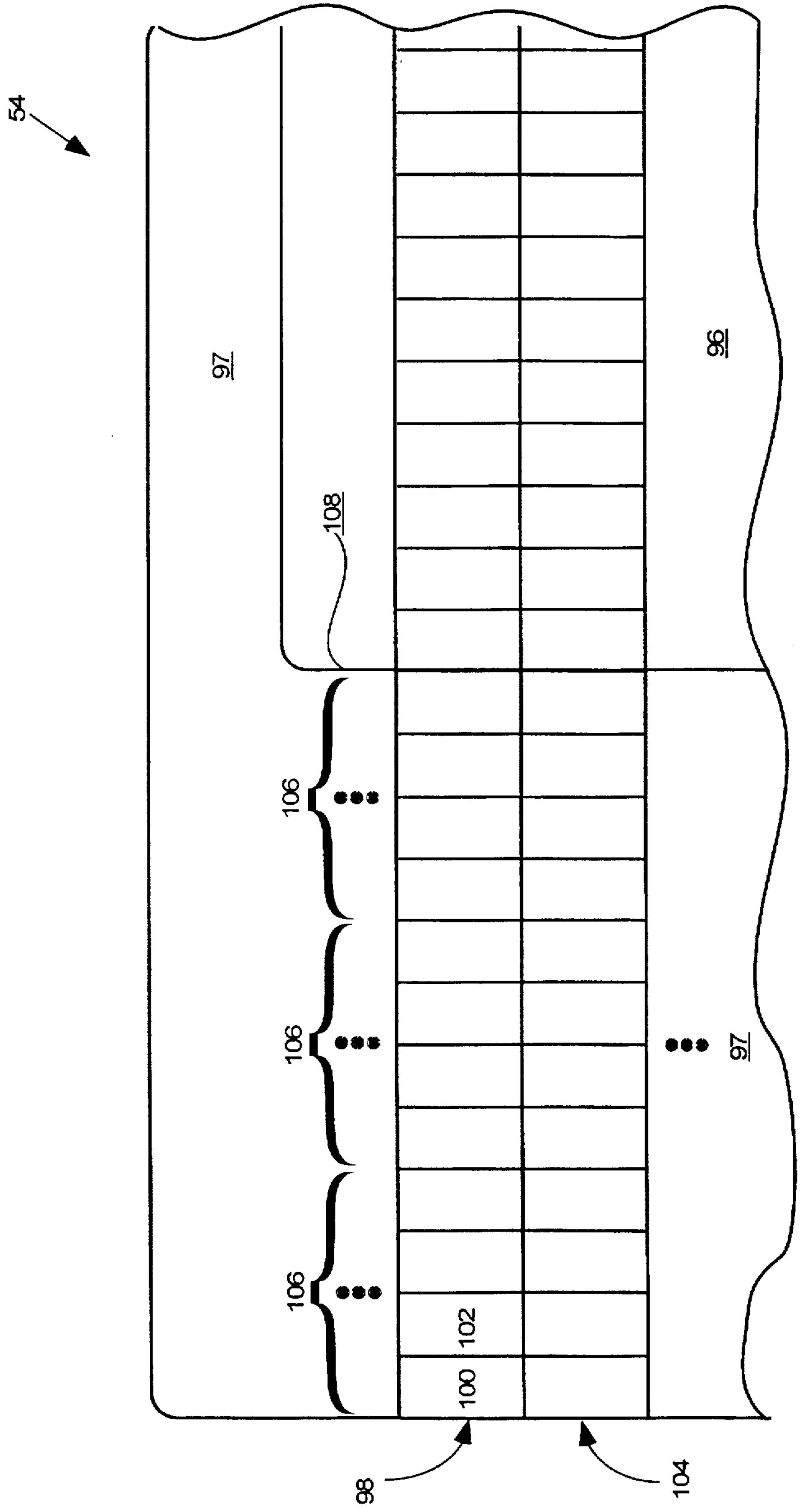
FIG. 3*a* is a diagrammatic illustration of a portion of a display screen showing graphics and video pixels of a displayed video window positioned at a discrete boundary between graphics pixel blocks.
Figure 4:
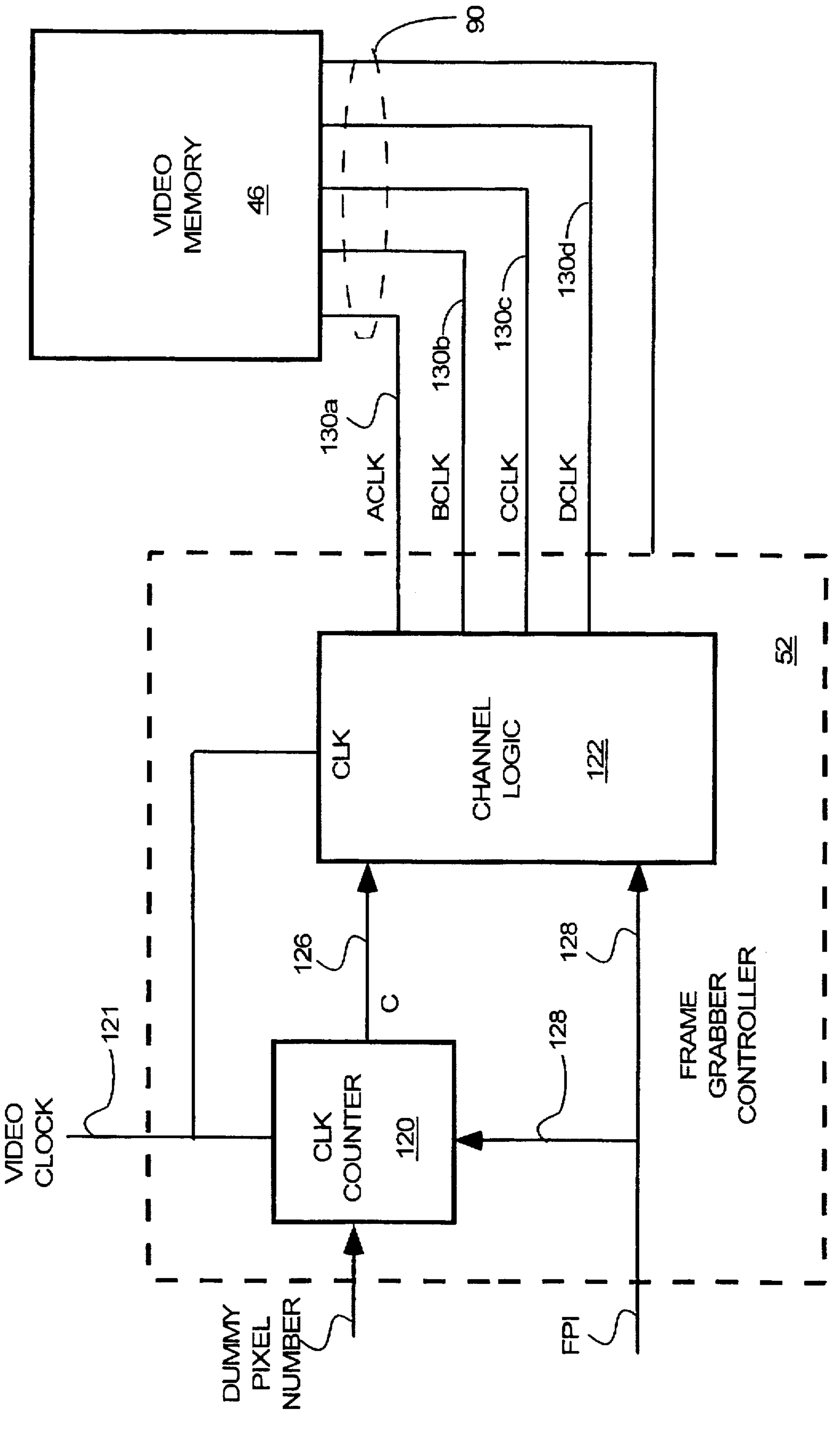
FIG. 4 is a block diagram of the dummy pixel logic of the present invention.

FIG. 3*a* is a portion of a display screen showing video pixels in a video window 96 and graphics pixels 97 surrounding video window 96. The pixels on the display screen are typically displayed in horizontal scan lines from left to right. For a particular horizontal scan line (or row) of pixels 98, the first pixel 100 on the left edge of the screen is displayed, followed by the next pixel 102 to the right, and so on, until the right edge of the screen is reached. The process then repeats with the next horizontal row of pixels 104 below the horizontal row just displayed, etc.

Figure 2A:
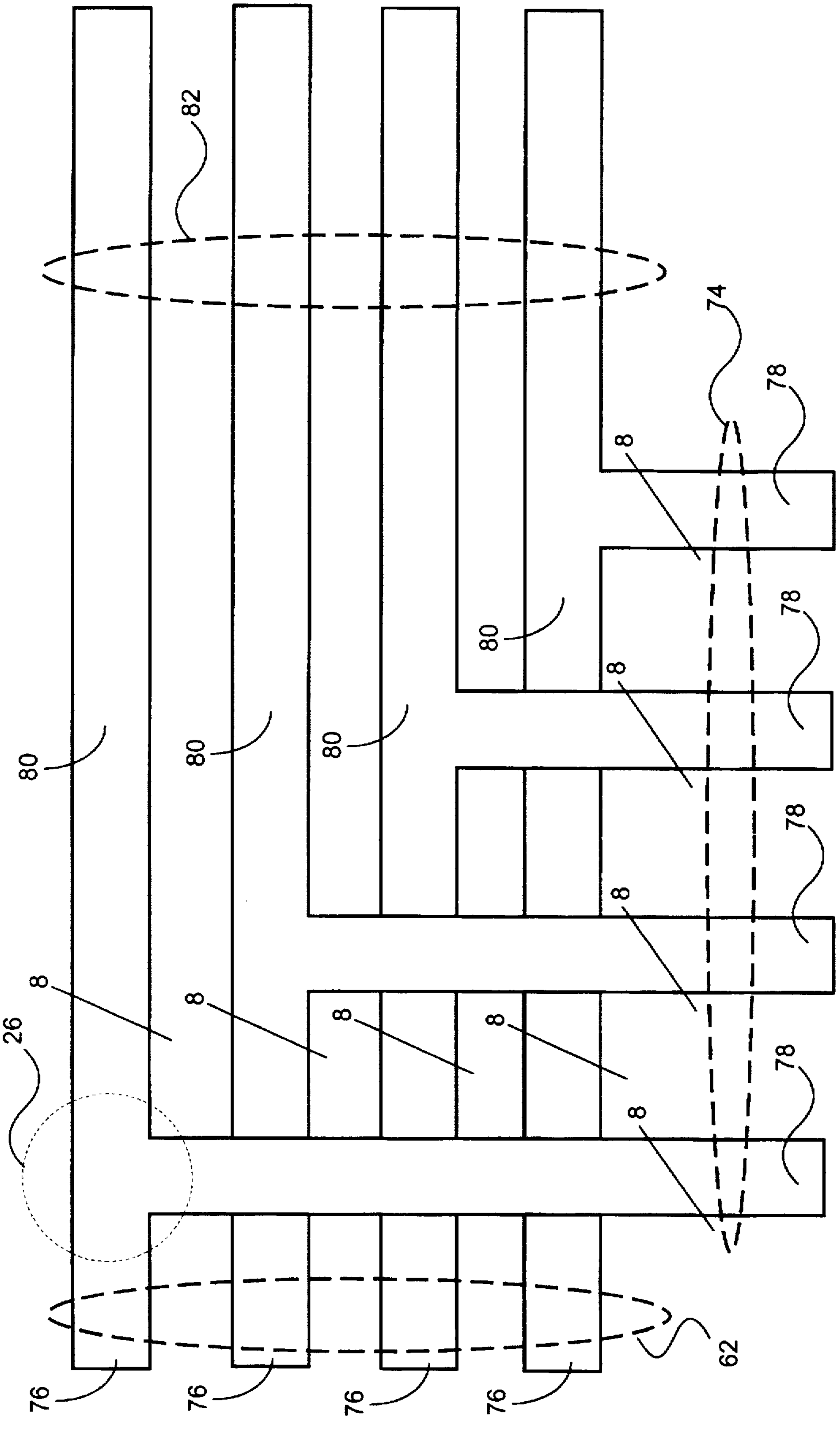
FIG. 2*a* is a schematic diagram illustrating multiplexed graphics and video channels in the display system shown in FIG. 2*a;*
Figure 2B:
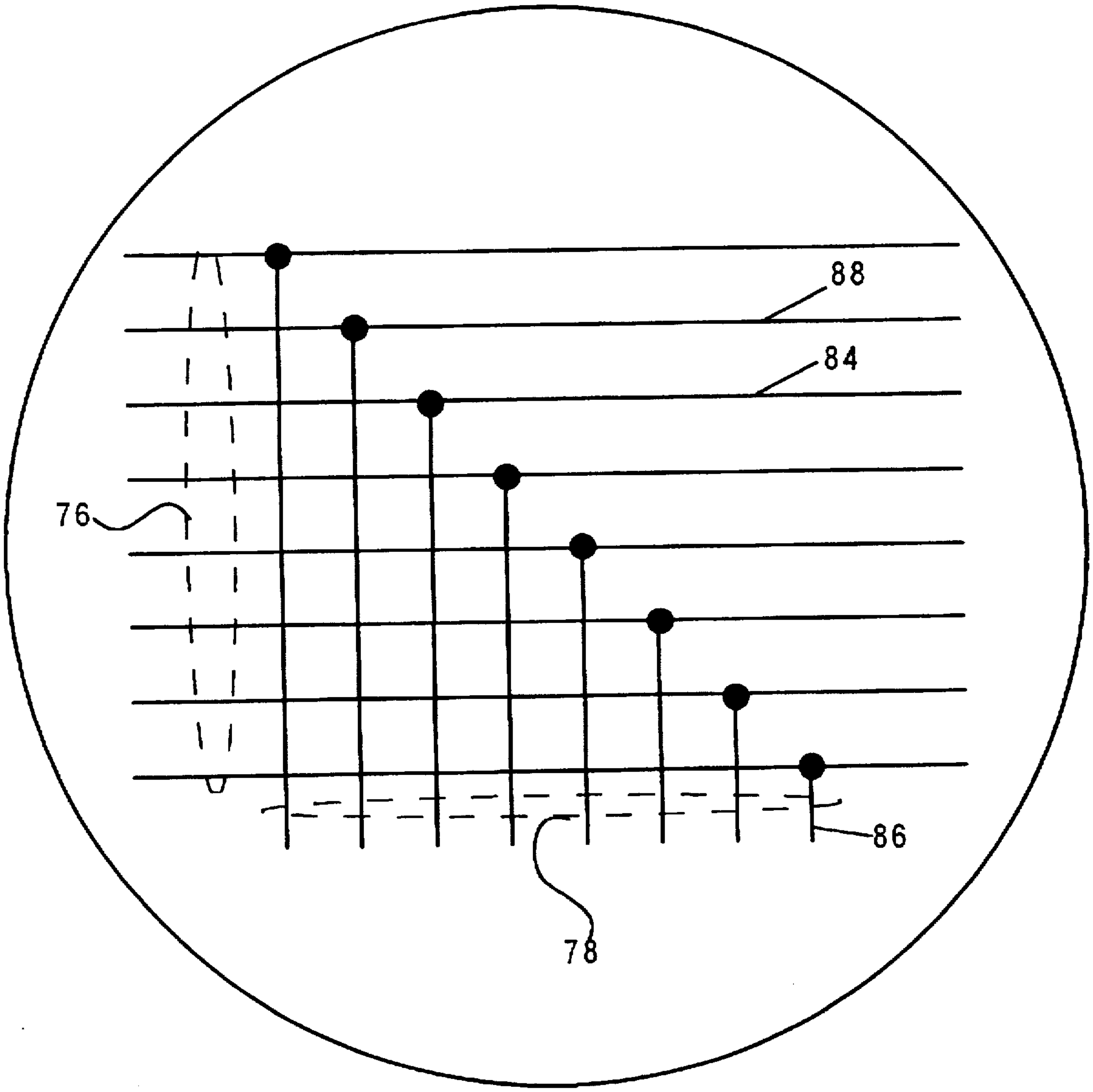
FIG. 2*b* is a schematic diagram illustrating a connection of a single graphics channel and video channel as shown in FIG. 2*b;*

Graphics memory 36 normally outputs blocks of four graphics pixels at a time to DAC 50 in the described embodiment. During this process, the source selection logic 48 enables all the tri-state buffers at the outputs of graphics memory 36 and disables all the tri-state buffers at the bus 74 outputs of video memory 46 so that only graphics channels are selected to output graphics data (the video memory is storing incoming video pixels from decoder/scaler 44 at this time). The graphics pixels are displayed sequentially on the display screen. Blocks 106 of four graphics pixels are displayed from left to right until the desired left border 108 of the video window is reached. At this point, the source selection logic 48 reads video pixel codes for the video window from the screen pixel map in window-type memory 38 (i.e., pixel codes having a value of 15 in the described embodiment). The source selection logic disables the tri-state buffers of all the graphics memory 36 outputs. Source selection logic 48 then signals the frame grabber controller 52 on bus 92 with the frame grabber enable signal to begin sequencing blocks of four video pixels at a time out of video memory 46. At the same time, source selection logic 48 enables tri-state buffers on the outputs of video memory 46 to allow video pixels on video channels 78 to be output from the video memory to the DAC. Using this process, blocks of graphics pixels are sent on output channels 80 (see FIG. 2*a*) when the channels 80 are selected to display graphics data, and blocks of video pixels are sent on output channels 80 when the channels 80 are selected to display video data.

The left border 108 of the video window 96 as shown in FIG. 3*a* is aligned with the edge of a block of graphics data, i.e. a discrete graphics block boundary. The left border of the video window is displayed after a block 106 of four graphics pixels have been displayed. In this situation, all four graphics channels are selected (enabled) to output a block of graphics pixels on output channels 80 until the video window is reached, at which time all the graphics channel tri-state buffers are disabled and all four tri-state buffers on video memory 46 are enabled to output a block of four video pixels on all four video channels 78. At the right edge of the video window (not shown), the source selection logic reads a graphics pixel code from window-type memory 38 and, in response, disables the video channels, signals the frame grabber controller to stop shifting out video pixels from video memory 46, and enables all four graphics channels. The same process occurs for each horizontal scan line.

Figure 3B:
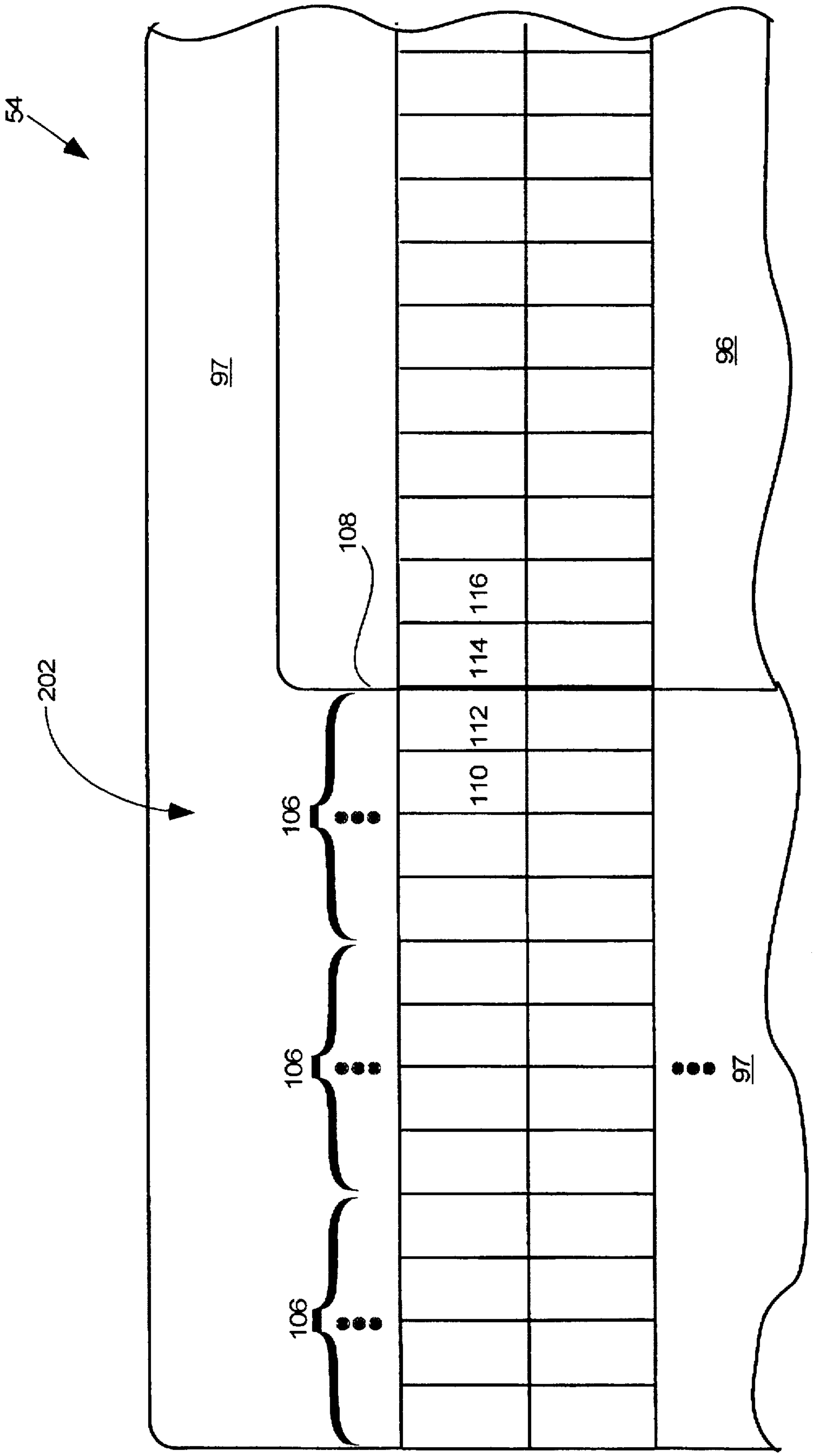
FIG. 3*b* is a diagrammatic illustration of a portion of a display screen showing a boundary between graphics and video data that occurs at an intermediate location within a pixel block.

FIG. 3*b* shows a different situation, in which the left border 108 of the video window is displayed between a graphics block boundary. In this situation, some of the four output channels 80 must be selected to output graphics pixels, and, simultaneously, some of the four output channels 80 must be selected to output video pixels. That is, a block of data on the four output channels 80 must include both graphics pixels and video pixels. In the example of FIG. 3*b*, the first two output channels must be graphics channels so that graphics pixels 110 and 112 are displayed, and the final two output channels must be video channels so that video pixels 114 and 116 are displayed.

To permit the video window to be displayed at an arbitrary graphics pixel boundary, video pixels must be output on specific video channels. The outputs of a video memory typically function by emptying out a block of all four video pixels (32 bits) in the output buffer of the video memory at once (for each 32 bit bus 70, 72 and 74). A video pixel is physically output on a video channel 78 only if the tri-state buffer for that video channel has been enabled. The next block of four video pixels in memory are then loaded into the output buffer of the video memory to be output at the next opportunity. This creates a problem when, as shown in FIG. 3*b*, only some of the video pixels need to be output. If only the third and fourth tri-state buffers are enabled, the first and second video pixels in the output buffer are lost and never seen in the video window. This loss of data creates a cropped or "clipped" video window picture. On the other hand, if all four video pixels are output every time video pixels are displayed (no outputs disabled), then the video window cannot be arbitrarily aligned on any graphics pixel boundary; the video window must be displayed with horizontal alignment restrictions such that, in an N-way multiplexed system, the left border of the video window can only be positioned at every Nth horizontal pixel.

A solution to this arbitrary video window alignment problem in accordance with the present invention is to insert a number of dummy video pixels ("dummy pixels") in the sequence of outputted video pixels to shift the actual video pixel data. In the example of FIG. 3*b*, two dummy pixels are inserted before tie block of video pixel data. This shifts the first and second video pixels of the block into the third and fourth pixel locations (positions) of the block, the former third and fourth video pixels are shifted into the first and second positions of the next block of video pixels, and so on. When the block of video pixels is outputted from the output buffer of the video memory, the first and second video channels are disabled and the data at the first and second pixel positions are lost. However, only dummy data is in those first and second pixel positions. The third and fourth video channels are enabled, allowing the former first and second video pixels to be output and displayed on the screen in their proper sequence.

The number of dummy video pixels required to place the video window on an arbitrary graphics pixel boundary without loss of video data is equal to the column number of the left border of the video window modulus the number of output channels 80. In the example of FIG. 3*b*, the video window begins at column number 202 (counting from the left edge of the screen). There are 4 output channels in a 4-way multiplexed system, so that the number of dummy pixels needed is 202 mod 4 (the remainder of 202/4), which equals 2. The microprocessor computes the number of dummy pixels required based upon the current position of the video window and stores the number in the frame grabber controller. Each time the video window is moved or resized, the microprocessor must update the number of dummy pixels in the frame grabber controller. The frame grabber controller 52 provides the dummy pixel value (i.e. the number of dummy pixels to insert) to the dummy pixel logic 53 (described below), which controls the clocking in of data from the decoder/scaler 44 to provide the proper number of dummy video pixels before each horizontal scan line of video pixels. Source selection logic 48 uses the pixel codes from window-type memory 38 to disable the proper tri-state buffers on the outputs to the video memory.

In the described embodiment, dummy pixels are created and inserted in the video memory by "clocking" identical video pixel values into multiple banks of the video memory 46 at the same time according to a clock signal (preferably, the video pixels are first clocked into shift registers and then stored into the banks of the video memory from the shift registers, as described above). The Banks that are clocked depending on the number of dummy pixels to be inserted is shown in Table 1.

TABLE 1

| Number of Dummy Video Pixels to be Inserted | Banks clocked |
|---|---|
| 0 | A |
| 1 | A, B |
| 2 | A, B, C |
| 3 | A, B, C, D |

For example, if two dummy pixels are required as in FIG. 3*b*, a single video pixel is clocked into Banks A, B, and C of the video memory simultaneously from decoder/scaler 44. The next video pixel from the decoder/scaler is clocked into Bank D. Only the video pixels loaded at Banks C and D will be selected to be output on video channels; the other two video pixels in Banks A and B are duplicate pixels of the pixel in Bank C (dummy pixels) that are lost. Dummy pixels are output in only one video pixel block per horizontal scan line, at the left border of the video window.

Dummy pixels for the graphics memory are not needed, since the graphics adapter chip typically generates graphics pixels for the entire screen and continuously outputs those pixels from the output buffer whether the tri-state buffers on the graphics memory are enabled or disabled. At the right edge of the video window, the source selection logic 48 simply selects the proper graphics or video channels according to the pixel map in window-type memory 38.

FIG. 4 is a block diagram of preferred dummy pixel logic 53 of the described embodiment for controlling the insertion of dummy pixels into the video pixel stream. Dummy pixel logic 53 preferably includes a counter 120 and lane logic 122. In the described embodiment, the dummy pixel value that represents how many dummy pixels to insert is a two-bit code that is written into the frame grabber controller 52 by microprocessor 31. This dummy pixel value is received by counter 120 on bus 24 before each incoming video scan line. Counter 120 is preferably a 2-bit modulo-4 counter that counts after each pixel is clocked into video memory 46 (known from the video clock 121 generated by the frame grabber controller). Counter 120 also receives a frame pixel indicator (FPI) signal on line 128, which clears counter 120 to zero when the first valid video pixel of a scan line is input to the video memory. The FPI signal can be, for example, generated by a flip-flop internal to the frame grabber controller which sets FPI high before the first video pixel on a scan line and clears FPI (low) after the first video pixel. The output (C) of the counter 120 is a two bit number output on bus 126 to channel logic 122.

Channel logic 122 receives the 2-bit count C on bus 126 and also receives signal FPI on line 128. The FPI signal is set at the first video pixel on a scan line, and indicates to logic 122 whether or not the current pixel being clocked into video memory 46 is the first (left-most) video pixel on a scan line, such as video pixel 114 of FIG. 3*b*. Channel logic 22 outputs four clock signals ACLK, BCLK, CCLK and DCLK on lines **130*a–d*, respectively, which are included in address/control bus 90 coupled to video memory 46. Each of the four clock signals 130*a–d* is coupled to an input Bank of video memory 46 as described above such that ACLK clocks a video pixel into Bank A, BCLK clocks a video pixel into Bank B, etc. A video pixel is clocked into a particular bank by applying a high pulse signal on a corresponding clock signal line 130*a–d*. Thus, if a pulse signal is sent on line 130*a***, a video pixel is clocked into Bank A.

Channel logic 22 implements the following logical equations:

ACLK=!FPI*(C==0)+FPI

BCLK=!FPI*(C==1)+FPI*(C>=1)

CCLK=!FPI*(C==2)+FPI*(C>=2)

DCLK=!FPI*(C==3)+FPI*(C==3)

which indicate that, for example, ACLK is provided as a high pulse signal on line **130*a* when FPI is false and C=0, or if FPI is true; BALK is a pulse signal on line 130*b* when FPI is false and C=1, or FPI is true and C is 1, 2 or 3; CCLK is a pulse signal on line 130*c* when FPI is false and C=2, or FPI is true and C is 2 or 3; and DCLK is a pulse signal on line 130*d* when FPI is false and C=3, or FPI is true and C is 3. Logic 22** can be implemented with gates and other electronic components as is well-known to those skilled in the art.

Figure 5:
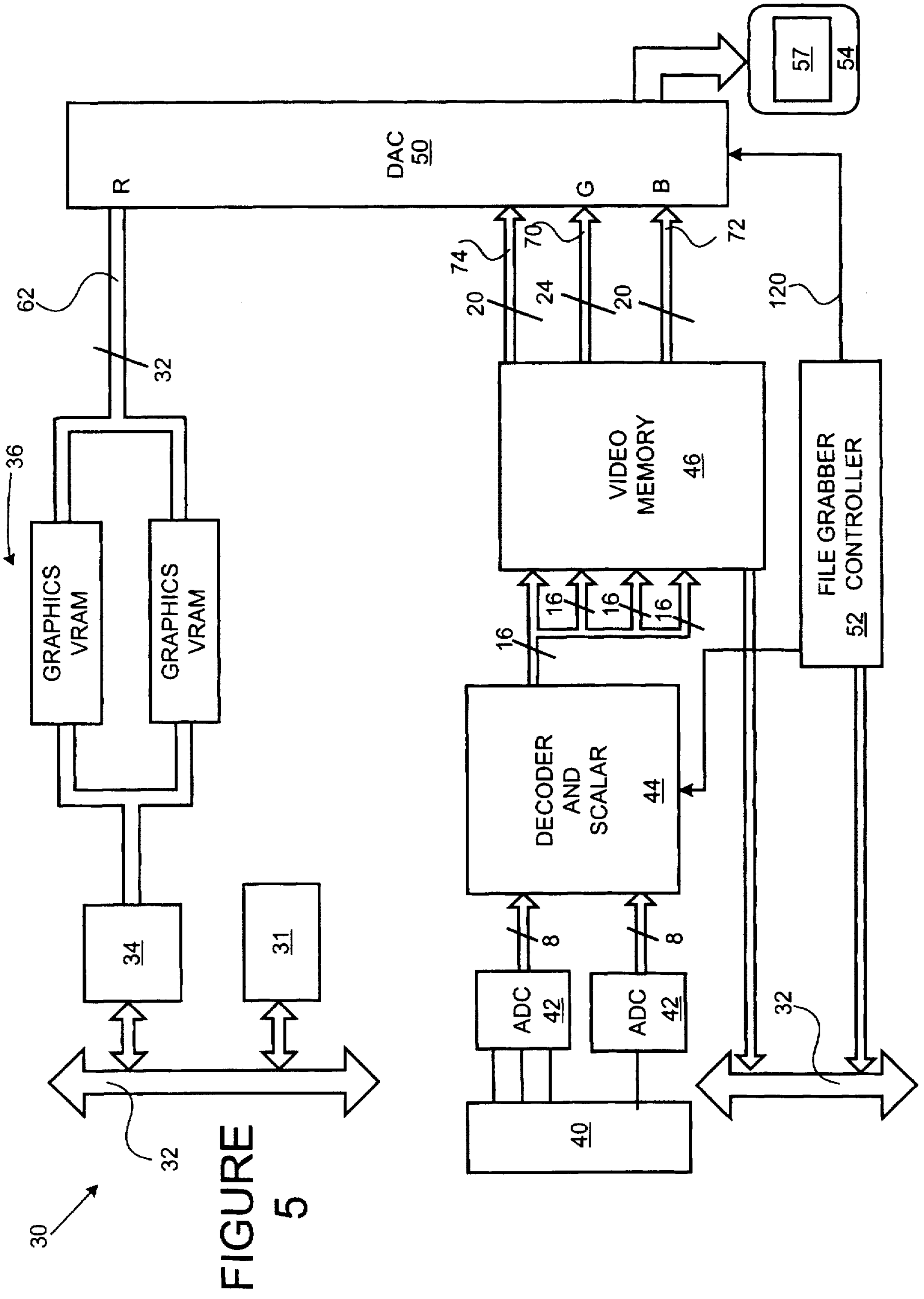
FIG. 5 is a block diagram of an alternate embodiment of a computer display system of the present invention.

FIG. 5 is a schematic view of a second embodiment 30' of display system 30. In display system 30', DAC 50 has been replaced with a different type of DAC 50'. DAC 50' includes multiplexing circuitry on the chip such that video channels 78 of bus 74 and graphics channels 76 of bus 62 are connected to inputs of DAC 50' instead of being physically connected together. A suitable DAC for use as DAC 50' is the Brooktree BT885 DAC. This specific model cannot support 24-bit video using 4-way multiplexing as described above. Instead, in the described embodiment, 16-bit video is preferably used, in which 5 bits are used for the red portion, 6 bits for the green portion, and 5 bits for the blue portion of the signal. Thus, a 20-bit bus 74 includes four video channels of 5 bits per channel.

DAC 50' preferably selects graphics and video channels internally. Therefore, no separate source selection logic 48 or window-type memory 38 is required in the present embodiment. To select the correct channels, DAC 50' requires the location of the video window. The microprocessor writes the video window location information to DAC 50'. This information can include the coordinates of the opposite corners of the displayed video window. DAC 50' knows when to switch from graphics channels to video channels and vice versa by using internal components to keep track of the displayed pixels. A counter can be used to count the column at which an inputted pixel is being displayed, and another counter is used to similarly count the row of the displayed pixel. Four registers of the DAC can be used to store the location of the video window, including the column of the upper left comer of the video window, the row of the upper left corner, the column of the lower right corner of the video window, and the row of the lower right corner. The DAC can compare the current counter values of the column and row of a displayed pixel with the values of the borders of the video window stored in the registers to determine if graphics pixels or video pixels should be selected and displayed. DAC 50' then enables or disables the proper video and graphics channels according to internal components, as is well-known to those skilled in art. Using the video memory of the previously-described embodiment, DAC 50' can display a 512×512 pixel video window.

DAC 50' also preferably includes a small first in first out (FIFO) queue. Video data can be buffered or stored in this FIFO until it is displayed. The FIFO thus eliminates the need for inserting dummy pixels on the video channels by dummy pixel logic 53, since the video data can be stored independently of displayed graphics pixels. The other components of display system 30' operate similarly to the components of display system 30.

By using a separate video memory for video data in the present invention instead of sharing memory for graphics and video data, the graphics memory bandwidth can be much larger. A much higher data transfer rate can thus be achieved when displaying graphics pixels using this configuration. The use of "N" graphics channels and video channels allows data to be displayed at a rate fast enough to make full use of the DAC's high speed and avoid slowing down graphics-intensive operations. Finally, the use of dummy video pixels permits the video window to be located on any pixel column of the screen (i.e., single pixel resolution) and not be constrained to a discrete boundary after a block of n graphics pixels in an n-way multiplexed system.

Although only one embodiment of the present invention has been described, it should be understood that the present invention may be embodied in many other specific forms without departing from the spirit or scope of the invention. Particularly, the source selection logic of the present invention can be implemented in many different ways to perform the function of selecting channels from graphics and video memories to display a video window with greater data bandwidth.

The display system of the present invention has been described as applied to various specific implementations. However, it should be appreciated that the described display system can be applied to a wide variety of applications. In some systems, for example, it may be possible to output specific pixels from video memory and align the video window without inserting dummy video pixels. In other implementations, it may be desirable to add a third source of displayed pixels such that three different buses are multiplexed before being input to the DAC. Therefore, the present examples and embodiments are to be considered as illustrative and not restrictive, and the invention is not to be limited to the details given herein, but may be modified within the scope of the appended claims.

What is claimed is:

1. A method for simultaneously displaying graphics data and video data on a display screen of a computer system having graphics memory and video memory arranged to store image information to be displayed an the display screen, the display screen displaying a multiplicity of pixels, wherein the graphics memory and the video memory are each arranged to sequentially transmit blocks of pixel data to the display screen on output channels, and wherein each block of pixel data includes data for a plurality of screen pixels that is transmitted simultaneously, the method comprising the steps of:

storing graphics data received from a graphics source in graphics memory;

storing video data received from a video source in video memory;

selectively outputting graphics data for a block of pixels simultaneously from the graphics memory on a number of graphics channels when only graphics data is to be transmitted to the screen on output channels connected to said graphics channels;

selectively outputting video data for a block of pixels simultaneously from the video memory on a number of video channels corresponding to said number of graphics channels when only video data is to be transmitted to the screen on said output channels, wherein said video channels are coupled to said graphics channels to form said output channels and wherein either graphics data or video data is output to a display screen on each output channel; and when both graphics data and video data are to be transmitted to the screen simultaneously in a single block of data on said output channels, selectively causing the output channels that are intended to carry graphics data to transmit only graphics data and selectively causing the output channels that are intended to carry video data to transmit only video data.

2. A method as recited in claim 1 wherein said step of selectively causing the output channels that are intended to carry graphics data to transmit only graphics data and selectively causing the output channels that are intended to carry video data to transmit only video data includes outputting graphics data from said graphics memory only on said intended graphics channels and outputting video data from said video memory only on said intended video channels.

3. A method as recited in claim 2 wherein said outputting graphics data from said graphics memory is accomplished by enabling, buffers at an output of said graphics memory, and wherein said outputting video data is accomplished by enabling buffers at an output of said video memory.

4. A method as recited in claim 2 wherein said graphics memory includes an output buffer coupled to said graphics channels and wherein said video memory includes an output buffer coupled to said video channels, wherein said output buffer stores pixel data which is output from said memory when said memory is instructed to next output data.

5. A method as recited in claim 4 wherein said video memory includes a shift register for storing pixel data, wherein a portion of said pixel data is shifted from said shift register to said output buffer when said pixel data is to be output.

6. A method as recited in claim 1 wherein said number of graphics channels and said number of video channels is four.

7. A method as recited in claim 1 wherein said step of selectively causing the output channels that are intended to carry graphics data to transmit only graphics data and selectively causing the output channels that are intended to carry video data to transmit only video data includes reading a memory arranged to store data indicative of which pixels on said screen are intended to display graphics data and which pixels on said screen are intended to display video data.

8. A method as recited in claim 7 wherein said video data transmitted to said screen is 24-bit true color video data.

9. A method as recited in claim 7, wherein said memory is a window-type memory.

10. A method as recited in claim 1 further comprising a step of receiving analog video signal from said video source and converting said video signal into digital video data and storing said digital video data in said video memory.

11. A method as recited in claim 10 further comprising a step of scaling said digital video data to a predetermined size.

12. A method of simultaneously displaying graphics data and video data on a display screen of a computer system having graphics memory and video memory, arranged to store image information to be displayed on the display screen, the display screen displaying a multiplicity of pixels, wherein the graphics memory and the video memory are each arranged to sequentially transmit blocks of pixel data to the display screen on output channels, and wherein each block of pixel data includes data for a plurality of screen pixels that is transmitted simultaneously, the method comprising the steps of:

storing graphics data received from a graphics source in graphics memory;

storing video data received from a video source in video memory;

selectively outputting graphics data for a block of pixels simultaneously from the graphics memory on a number of graphics channels when only graphics data is to be transmitted to the screen on output channels connected to said graphics channels;

selectively outputting video data for a block of pixels simultaneously from the video memory on a number of video channels corresponding to said number of graphics channels when only video data is to be transmitted to the screen on said output channels, wherein said video channels are coupled to said graphics channels to form said output channels and wherein either graphics data or video data is output to a display screen on each output channel, wherein said graphics memory includes an output buffer coupled to said graphics channels and wherein said video memory includes an output buffer coupled to said video channels, wherein said output buffer stores pixel data which is output from said memory when said memory is instructed to next output data, and wherein said video memory includes a shift register for storing pixel data, wherein a portion of said pixel data is shifted from said shift register to said output buffer when said pixel data is to be output;

when both graphics data and video data are to be transmitted to the screen simultaneously in a single block of data on said output channels, selectively causing the output channels that are intended to carry graphics data to transmit only graphics data and selectively causing the output channels that are intended to carry video data to transmit only video data such that graphics data from said graphics memory is output only on said intended graphics channels and video data from said video memory is output only on said intended video channels; and inserting a number of dummy video pixel values before said video data in said shift register, said number of dummy pixel values being based on the position of a boundary separating graphics pixels and video pixels on said screen and the number of output channels.

13. A method as recited in claim 12 wherein said step of inserting said dummy video pixel values includes clocking a video pixel value into a plurality of pixel locations in said shift register of said video memory when said video data is received from said video source, such that said dummy video pixel values are not output from said video memory.

14. An apparatus for displaying a video window on a display screen of a computer system, comprising;

a graphics memory having a set of output graphics channels suitable for simultaneously transmitting graphics data for a plurality of screen pixels;

a video memory having a set of output video channels suitable for simultaneously transmitting video data for a plurality of screen pixels, wherein each video channel is coupled to a corresponding graphics channel to form a pair of channels and wherein an output channel is coupled to each of said pairs of graphics channels and video channels, a selection element for selectively causing data from said graphics memory and said video memory to pass on each of said output channels such that the output channels transmit a block of pixel data that simultaneously includes both graphics data and video data divided on a discrete pixel basis; and a converter element for converting data on said output channels into a form suitable for driving the display screen of the computer system.

15. An apparatus as recited in claim 14 wherein said graphics memory comprises a VRAM chip storing graphics data from a graphics chip.

16. An apparatus as recited in claim 14 wherein said video memory comprises a VRAM chip storing video data received from a video source.

17. An apparatus as recited in claim 14 wherein said selection element includes window-type memory having a memory map of a location of a video window displayed on a display screen of a computer system.

18. An apparatus as recited in claim 17 wherein said selection element includes source selection logic operative to read said memory map in said window-type memory and select said data on said output channels according to said window-type memory.

19. An apparatus as recited in claim 18 wherein said source selection logic is coupled to said graphics memory and said video memory and is operative to enable output buffers of said graphics memory and said video memory to select said data on said output channels.

20. An apparatus as recited in claim 17 wherein said converter element includes a digital to analog converter (DAC) coupled to said video memory and operative to convert a digital video signal from said video memory to an analog signal capable of being displayed on said display screen.

21. An apparatus as recited in claim 20 further comprising a frame grabber controller coupled to said video memory and said source selection logic for controlling the output of video data from said video memory.

22. An apparatus as recited in claim 14 wherein said set of graphics channels and said set of video channels each include four channels.

23. An apparatus for displaying a video window on a display screen of a computer system, comprising:

a graphics memory having a set of output graphics channels suitable for simultaneously transmitting graphics data for a plurality of screen pixels;

a video memory having a set of output video channels suitable for simultaneously transmitting video data for a plurality of screen pixels, wherein each video channel is coupled to a corresponding graphics channel to form a pair of channels and an output channel is coupled to each of said pairs of graphics channels and video channels, and wherein said video memory stores a number of dummy pixels positioned before said video data in said video memory such that said dummy pixels are output on video channels that are not selected to output to said converter element;

a selection element for selectively causing, data from said graphics memory and said video memory to pass on each of said output channels such that the output channels transmit a block of pixel data that simultaneously includes both graphics data and video data divided on a discrete pixel basis; and a converter element for converting data on said output channels into a form suitable for driving the display screen of the computer system.

24. A computer system comprising:

a processor, a memory clement coupled to said processor;

a graphics adapter coupled to said processor for receiving commands from said processor and outputting graphics data according to the commands;

a graphics memory coupled to said graphics adapter for storing said graphics data and having a set of output graphics channels suitable for simultaneously transmitting said graphics data for a plurality of screen pixels;

a video converter for converting a video signal from a video source to video data suitable for storage in video memory;

a video memory coupled to a said video converter for storing said video data and having a set of output video channels suitable for simultaneously transmitting video data for a plurality of screen pixels, wherein each video channel is coupled to a corresponding graphics channel to form a pair of channels and wherein an output channel is coupled to each of said pairs of graphics channels and video channels;

a selection element for selectively causing data from said graphics channels and said video channels to pass on each of said output channels such that the output channels transmit a block of pixel data that simultaneously includes both graphics data and video data divided on a discrete pixel basis; and a converter element for converting data on said output channels into a form suitable for displaying said data; and a display screen coupled to said converter element operative to display said converted data.

25. A computer system as recited in claim 24 wherein said video converter includes an analog-to-digital converter (ADC) for converting an analog video signal to a digital signal.

26. A computer system as recited in claim 25 wherein said video converter includes a decoder/scaler coupled to said ADC operative to convert said digital signal output from said ADC to video data suitable for storage in said video memory.

27. A computer system as recited in claim 24 wherein said graphics memory comprises a VRAM chip storing graphics data from a graphics chip and said video memory comprises a VRAM chip storing video data received from a video source.

28. A computer system as recited in claim 27 wherein said video VRAM chip includes a tri-port VRAM chip having two sequential access ports and one random access port.

29. A computer system as recited in claim 24 wherein said selection element includes window-type memory storing a memory map of locations of said pixels of video data displayed on said computer screen.

30. A computer system as recited in claim 29 wherein said selection element includes source selection logic operative to read said memory map in said window-type memory and select said data on said video channels according to said window-type memory.

31. A computer system as recited in claim 30 further comprising a frame grabber controller coupled to said video memory and said source selection logic.

32. A computer system as recited in claim 24 wherein said converter element includes a digital-to-analog converter (DAC).

* * * * *

UNITED STATES PATENT AND TRADEMARK OFFICE
CERTIFICATE OF CORRECTION

PATENT NO. :5,896,140

DATED :April 20, 1999

INVENTOR(S) :James O'Sullivan

It is certified that error appears in the above-identified patent and that said Letters Patent is hereby corrected as shown below:

Column 2, line 4, change "(KGB)" to --(RGB)--

Column 3, line 41, change "off" to --of--

Column 11, line 13, change "iriput" to --input--

Column 12, line 15, change "us,ed" to --used--

Column 12, line 23, change "dumnmy" to --dummy--

Column 14, line 61, change "tie" to --the--

Column 17, line 16, change "comer" to --corner--

Column 18, line 10, change "an" to --on--

Column 18, line 54, change "enabling, buffers" to --enabling buffers--

Column 21, line 21, change "causing, data" to --causing data--

Column 21, line 32, change "clement" to --element--

Signed and Sealed this

Twenty-third Day of November, 1999

*Attest:*

Q. TODD DICKINSON

*Attesting Officer*

*Acting Commissioner of Patents and Trademarks*